Feb. 9, 1943.  T. G. JUNGERSEN  2,310,790
OPTICAL REFLECTING MATERIAL
Filed Nov. 19, 1937  3 Sheets-Sheet 1
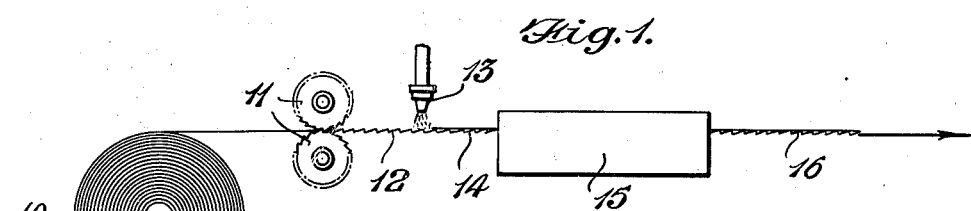
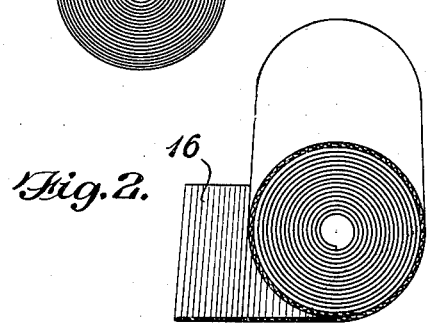
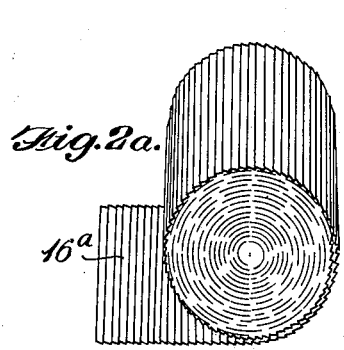
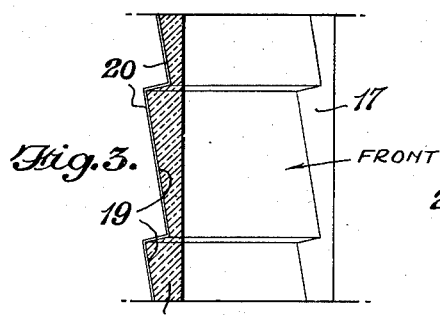
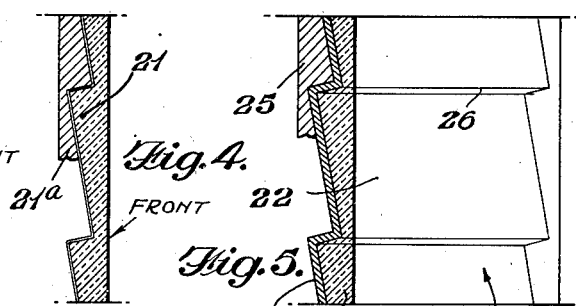
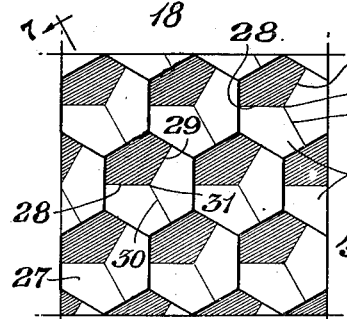
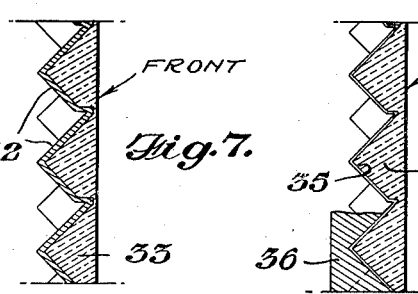
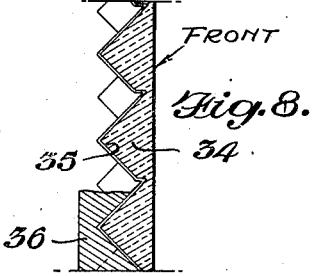
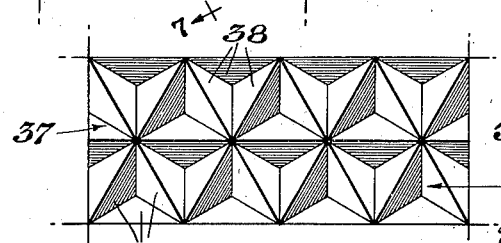
Inventor
T. G. Jungersen
By A. Yates Dowell
Attorney Feb. 9, 1943. T. G. JUNGERSEN 2,310,790
OPTICAL REFLECTING MATERIAL
Filed Nov. 19, 1937 3 Sheets-Sheet 2
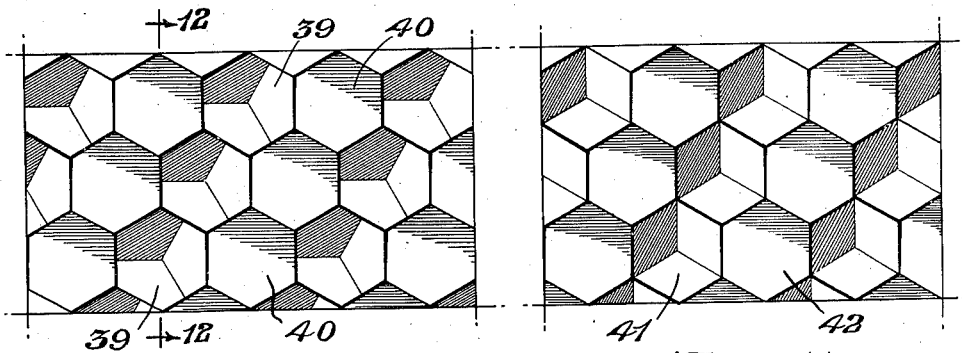
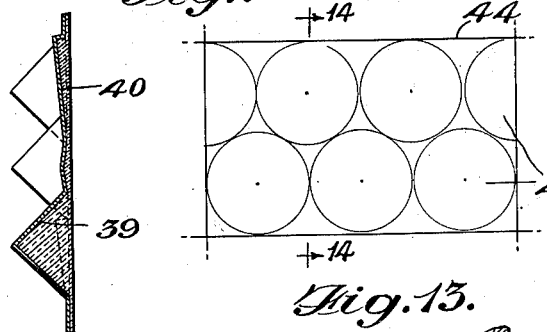
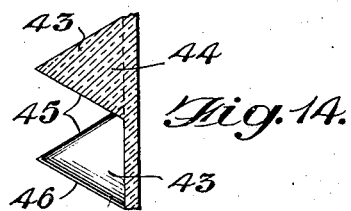
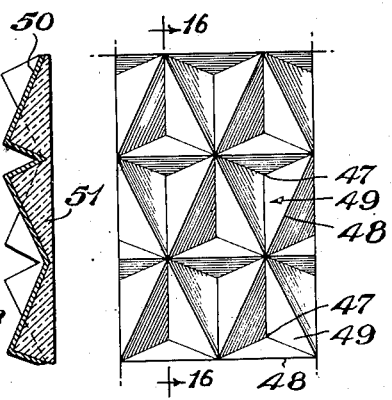
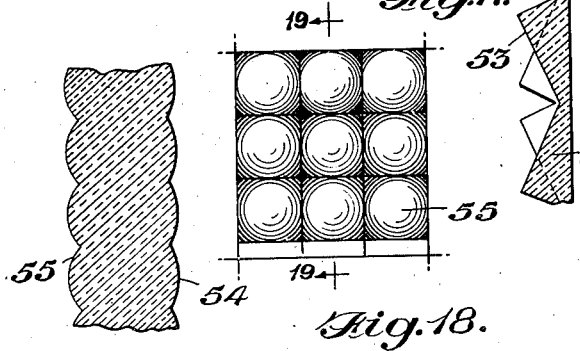
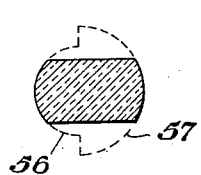
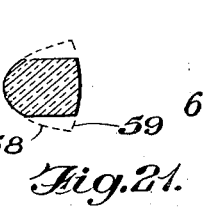
Inventor
T. G. Jungersen Feb. 9, 1943. T. G. JUNGERSEN 2,310,790
OPTICAL REFLECTING MATERIAL
Filed Nov. 19, 1937 3 Sheets-Sheet 3
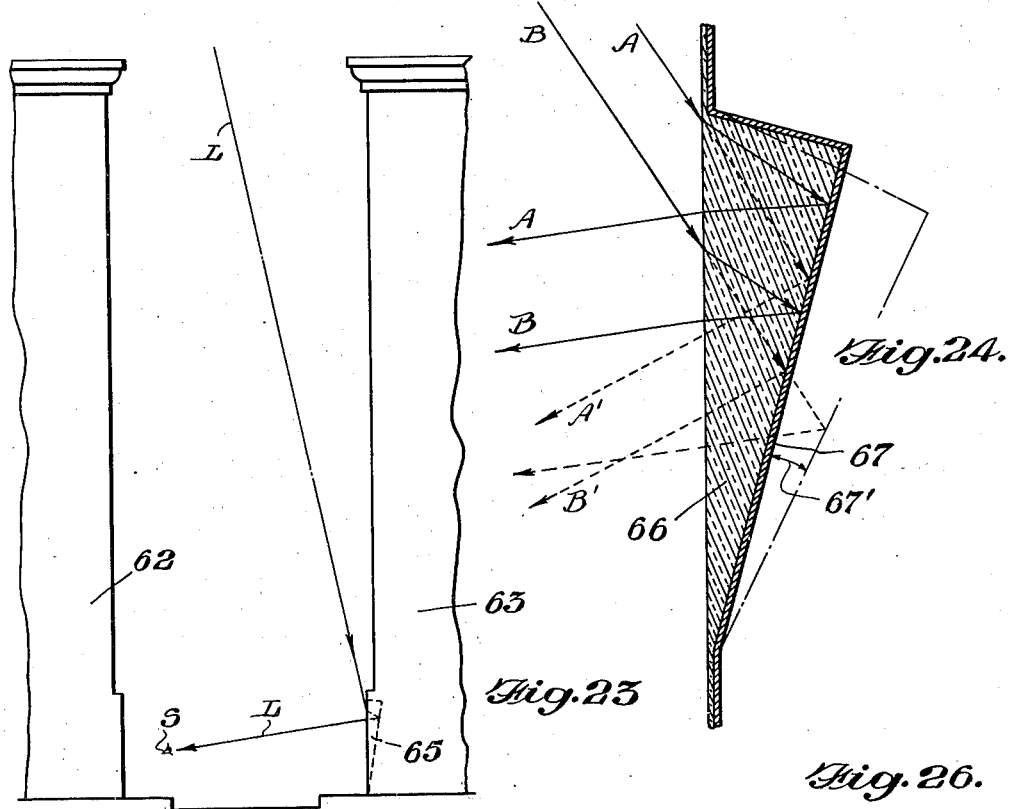
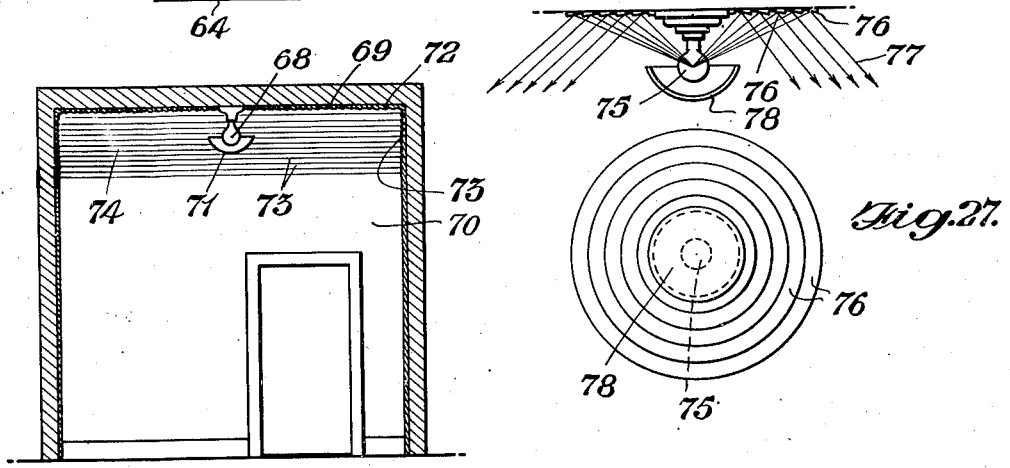
Inventor
T. G. Jungersen
By A. Yates Dowell
Attorney Patented Feb. 9, 1943

2,310,790

UNITED STATES PATENT OFFICE 2,310,790

OPTICAL REFLECTING MATERIAL

Thoger G. Jungersen, Mimico, Ontario, Canada

Application November 19, 1937, Serial No. 175,541

28 Claims. (Cl. 88—105)

This invention relates to optical material for the reflection of light and more particularly to material capable of reflecting light from a source to a predetermined object or objects.

Previously known reflectors have been capable of reflecting light from a given source to a particular object, but such reflectors have been delicate, cumbersome, expensive to manufacture, requiring some protecting means, generally not suitable for mass production and hence no wide use of such reflectors is found. A further disadvantage of previously known reflecting means is found in the relatively large size of the parts or design necessary for the solution of particular reflecting problems. Examples of such known reflectors are disclosed in the German patent to Hartman and Jungersen No. 362,136, patented October 24, 1922, and the Danish patent to Norreso, No. 33,653, patented September 1, 1924.

Reflectors of the type used today are as a rule fabricated, at least in part, of glass, which is relatively difficult to manufacture into shapes other than those of the simplest form, which is easily broken and is so expensive as to prohibit its use in many instances. Finally, reflectors of this type when broken, lose the function of the entire reflector, perhaps at a time when it is most needed, for wide use of reflectors is made for safety purposes.

It is an object of the present invention to provide reflecting material capable of reflecting light in accordance with the manner desired, and of such nature as to facilitate its fabrication. It is a further object to provide a reflecting material having a reflecting surface of particular design.

Other objects and the nature and advantages of the invention will be apparent from the following description taken in conjunction with the accompanying drawings, wherein:

Fig. 1 is a schematic showing of a process for the formation of flexible sheet material bearing a reflecting surface in accordance with the laws of optics;

Fig. 2 is a perspective view of a roll of such flexible reflecting material;

Fig. 2a is a view in perspective of a roll of reflecting material in accordance with the invention;

Fig. 3 is an enlarged perspective view, partly in section, of a portion of reflecting material in accordance with the invention;

Fig. 4 is a sectional enlarged fragmentary view of another form of reflecting material;

Fig. 5 is an enlarged perspective view, partly in section of another form of the invention;

Fig. 6 is an enlarged plan view of a portion of a reflecting surface in accordance with the invention;

Fig. 7 is a section of the material shown in Fig. 6 taken along the line 7—7 of Fig. 6;

Fig. 8 is an enlarged sectional view of a modification of the embodiment shown in Fig. 6;

Fig. 9 is a view similar to Fig. 6 but of a modified form of reflecting surface;

Fig. 10 is a view similar to Fig. 6 but showing a modified form of reflecting surface;

Fig. 11 is a view similar to that shown in Fig. 6 but disclosing a modified form of reflecting surface;

Fig. 12 is a view in section taken along line 12—12 of Fig. 10;

Fig. 13 is an enlarged plan view of a fragment of material in accordance with the invention;

Fig. 14 is a sectional view taken along line 14—14 of Fig. 13 looking in the direction of the arrows;

Fig. 15 is an enlarged plan view of a modified form of the invention;

Fig. 16 is a view in section taken along line 16—16 of Fig. 15, looking in the direction of the arrows;

Fig. 17 is a cross sectional view similar to that shown in Fig. 16 but of a modified form of the invention;

Fig. 18 is an enlarged fragmentary plan view of reflecting material in accordance with the invention;

Fig. 19 is an enlarged cross sectional view taken along line 19—19 of Fig. 18, looking in the direction of the arrows;

Fig. 20 is a view similar to Fig. 19 showing the geometric proportions of the optical surfaces;

Fig. 21 is a view similar to Fig. 20 of a modified form of the invention;

Fig. 22 is a view similar to Fig. 19 of a modified form of the invention.

Fig. 23 is a diagrammatic representation of two tall buildings on opposite sides of a street, one of said building having incorporated therein at its lower portion an embodiment of the invention;

Fig. 24 is an enlarged sectional view diagrammatically showing the utilization of that embodiment of the invention shown in Fig. 23;

Fig. 25 is a cross sectional view of a room, the ceiling and the upper portion of the walls of which are covered with material in accordance with the invention;

Fig. 26 is a sectional view of a reflecting surface in accordance with the invention formed in a symmetrical geometrical pattern; and, Fig. 27 is a plan view of same.

Referring to Fig. 1, a roll of flexible material 10, such as for example, paper, fabric or metal or an organic material such as a cellulose derivative or other organic or inorganic materials, may be fed through forming rollers 11 with or without the application of pressure or heat which impress upon the sheet material the proper optical surface. The now "formed" material 12 may be then "filled-in" by spray nozzle 13 or other suitable means with a transparent flexible material, such as, for example, a cellulose derivative or other suitable organic or inorganic material. The "filled-in" material 14 may then be passed through a chamber 15 wherein the filling may be dried or otherwise treated whereby it may present a proper surface on its exterior and form a suitable bond between it and the flexible material base. The finished material which may or may not be flexible, having a protected reflecting surface of proper optical design 16 may then emerge from the treating chamber 15 and may be rolled as shown in Fig. 2 or cut to various sizes or shapes for different purposes.

In Fig. 2a a roll of reflecting material 16a is shown which may merely comprise sheet metal formed in accordance with the laws of optics to present a reflecting surface operative to reflect light in a desired predetermined manner. It is to be understood that the embodiment illustrated in Figs. 1 to 22, inclusive, may similarly comprise a single element.

Another type of surface which may be formed in any of various ways, such as for example, by press means, is shown in Fig. 3 which discloses a magnified perspective view of a portion of a flexible sheet surface which may be a cellulose derivate or other organic or inorganic substance in accordance with the invention. The front side 17 of the flexible transparent sheet 18 is preferably plain whereas the backside is formed with inclined facets 19 which may be coated on their backs with paint, silver nitrate, or other opaque or semi-opaque material 20, to form a reflecting surface. This coating may be applied in various ways, such as by precipitation, plating, brushing, flooding, or spraying from a nozzle similar to that as shown in Fig. 1, and referred to by numeral 13. This design is adapted to reflect light at an angle to the line of light transmitted to it. The facets 19 may be flat or curved to a certain extent and may occur as often as ten or even one hundred to the inch, or even more or less than these numbers, depending upon the service desired of the reflector. When it is essential that the finished flexible reflector be very thin it will be of course necessary to have a great number of facets per unit of length. In service, light striking the sheet reflector will pass through the transparent front surface 17 and be refracted toward the reflecting back surface onto the facets 19 and be reflected back through the transparent material 18 and refracted through the front surface to an object or a light receiver, such as for example, the human eye. It will be seen from the above that the embodiment shown in Fig. 3 is an excellent means for reflecting light from the sky on horizontal planes toward an object or objects close to the ground.

In Fig. 4 I have shown a cross section of a portion of a reflector 21 similar to that shown in Fig. 3, having its back portion filled in with a substance 21a which may have adhesive properties whereby the flexible sheet reflector may be readily secured to a wall, or other surface.

The flexible sheet reflector 22, referring to Fig. 5, comprises a body element 23 which may be of metal foil formed with the proper optical surface, a transparent filler 24 which may be sodium silicate, a cellulose derivative or gelatin product or other suitable material, on its front side and a filler 25 which may or may not have adhesive properties. The filler 24 not only fills in the vacities formed by the facets, but preferably is a trifle thicker to form a protecting cover for the corners 26, formed by the edges of adjoining facets. In this embodiment the foil or sheet 23 acts as a reflecting surface and the transparent filler 24 may act to protect the reflecting surface 23 and as a refracting medium. It is to be understood that the filler on either of the surfaces of the sheet may have adhesive properties.

The reflecting surface of the flexible sheet may take other forms from that disclosed in Fig. 3, for example, it may be composed of a plurality of inverted pyramids 27 as shown in Fig. 6, each pyramid having a hexagonal base and three plane sides intersecting each other to form the three lines 28, 29 and 30, and the apex 31. To those skilled in optics, it will be readily apparent that this type of reflecting surface efficiently reflects light back to the source from which it emanates. This reflector, as shown in cross section in Fig. 7, may comprise a formed metal foil back 32 and a transparent filler 33 at its front side. A similar reflector may also be formed in a manner different from that shown in Fig. 7 as for example shown in Fig. 8, which is similar to that shown in Fig. 4, but varying in facet design and in corresponding optical properties, and comprises a formed plastic material 34 which may have a coating on its back surface 35 of silver nitrate, paint, pitch or other opaque or semi-opaque material. This embodiment may or may not have on its back a filler 36 which may or may not have adhesive properties.

The reflector may take still other forms, one example of which is illustrated in Fig. 9. This embodiment comprises a plurality of triangular facets 37 forming the bases of triangular pyramids the sides 38 of which also form triangles. While this form of reflector operates to reflect a substantial portion of the light received, back to the source it is not as efficient as that form, illustrated in Fig. 6. The construction of the reflector illustrated in Fig. 9 may take either the form of that shown in cross section, Fig. 7, or that shown in cross section in Fig. 8, or other forms.

It is often desirable to utilize a reflecting surface which will be effective to reflect light from different sources at various times when said sources are available to an object or objects more or less constantly located so far as the reflection of light is concerned. For example, such reflecting surface may be effectively utilized on a sign which has to be read both in the day time by light from the sky and at night by light originating from the object itself or close by. Such reflecting surfaces are depicted in Figs. 10 and 11, respectively. The reflecting surface shown in Fig. 10 comprises a series of reflecting units 39, which may be similar to the reflecting units 27 shown in Fig. 6, and a series of reflecting units 40, arranged as shown, having a generally hexagonal outline and a tilted plane or slightly curved surface similar to those of facets 19 of the reflecting material shown in Fig. 3.

The reflecting units 39 operate to reflect light back to a source and may be effectively used at night, for example to reflect light from the headlights of automobiles back to their drivers. The reflecting units 40 are arranged to reflect light from another source, for example, the sky, whereby the same sign which is utilized to reflect light from the headlamps of an automobile back to its driver may be utilized in the day time to reflect light from the sky to the same driver. In Fig. 11, the reflecting units 41 operate to reflect light back to its source and perform a function similar to the reflecting units 39. In this figure the reflecting units 42 are similar to the reflecting units 40 in Fig. 10 and perform a similar function. The relative size of the reflecting units may be much smaller than that shown in the drawing and they may be fabricated in a manner similar to that utilized in connection with the embodiments shown in Figs. 3 to 9, inclusive. The finished reflector may be flexible, easily cut, stamped out into required shapes for use in various places for safety signals, signs, illumination, decorations, etc.

In Figs. 13 and 14, I have shown a reflecting unit comprising conical units 43 formed in a plastic material 44 which may be treated on its back surface 45 with an opaque or semi-opaque material such as silver nitrate, pitch or paint 46. The bases of these reflecting units 43 are circular as indicated in Fig. 13. This form of unit, however, is relatively inefficient.

The different types of reflecting units in each of the modifications shown in Figs. 10 and 11 may be arranged in alternate rows as shown in Figs. 10 and 11, or in other geometrical designs, or they may be heterogeneously dispersed throughout the entire reflecting surface, or they may be arranged in accordance with a scheme or plan to reflect one particular sign during the day and another during the night. For example, the day units may be arranged on the reflecting surface to spell out the word "open" and similarly the units which reflect light back to the source may be arranged to spell out the word "closed."

Whereas the form of reflecting surface disclosed in Fig. 9, Fig. 6 and the reflecting unit 41 in Fig. 11, in Figs. 13, 19, 20, 21 and 22 operate to reflect light back to its source, it may be desirable under certain conditions to utilize a reflecting surface similar to those surfaces but operative to efficiently reflect light at an angle other than perpendicular to the reflector. The surface illustrated in Fig. 15 functions in this manner and may be utilized in reflecting signs located at road intersections and at curves in a road. It will be noted that the apexes 47 are not centered with respect to the bases 48 of the triangular pyramids 49 and that the pyramids 49 are not all arranged in the same manner, whereby the reflector will effectively function to reflect light to cars approaching it in opposite directions.

In Fig. 16 one form of this flexible material is shown in cross section, depicting a reflecting surface 50 which may be metal foil filled in with a plastic material 51 such as a cellulose derivative.

Fig. 17 is a similar sectional view disclosing a molded, stamped, or otherwise formed transparent plastic material 52 which may be coated on its back surface 53 with opaque or semi-opaque material.

In Figs. 18 and 19 is illustrated a form of reflecting unit which may combine with the reflecting surface 54 a lens front 55. As shown, many of such units may make up a sheet of reflecting material which may be flexible, and may be fabricated from plastic substance such as cellulose derivatives whereby the entire sheet may be formed as disclosed in Fig. 1 and rolled as shown in Fig. 2. The individual units may take the geometric form shown in Fig. 20 with a lens surface comprising a portion of the hemisphere or cylinder 56 and the reflecting surface comprising a portion of the larger hemisphere or cylinder 57.

In Fig. 21 I have shown a modified form of unit in which the lens surface in section is a portion of parabola 58 and the reflecting surface in cross section is a portion of another arc 59. A still further form of unit may comprise a circular or parabolical lens surface 60 as shown in Fig. 22 and a generally flat reflecting surface 61. This reflector like those previously described may be formed in accordance with the process utilized for the manufacture of those embodiments shown in Figs. 3 to 9, inclusive. For example the reflecting surface 54 may be made of foil and the lens surface 55 may be rolled or stamped of plastic material which is later attached to the reflecting surface 54, or the entire unit may be fabricated of plastic or other flexible material and an opaque or semi-opaque reflecting surface effected at 54 by precipitation, plating, painting, spraying or otherwise formed, or in any other suitable manner. The modification shown in Fig. 22 may be, of course, fabricated similarly to the form shown in section in Fig. 19.

The lens surface of the units shown in Figs. 20 and 21, respectively, function in accordance with the laws of optics to direct or refract light emanating from a source to the reflecting surface whereupon the light is returned and again refracted through the lens surface to an object or objects. Though the form in Fig. 20 is operative to a certain extent to reflect a sufficient quantity of light, that form shown in Fig. 21, with the parabolic lens surface, is particularly effective and efficient to reflect a maximum of light to the desired object when located generally in front thereof. It is not always necessary that these lenses be absolutely precise in their geometry for inaccuracies in their manufacture may serve to spread the reflected light in a desirable manner, whereby all the light is not reflected to a single point, but in a predetermined general direction.

Reflecting surfaces formed in accordance with my invention may be effectively utilized in such service and under such conditions that would prevent the use of or prevent the effective reflection of light from other known reflectors. For example, as schematically illustrated in Figs. 23 and 24, a reflector, in accordance with my invention, is shown performing a function which would be impossible or at least impracticable for other known reflectors. In Fig. 23 two tall buildings 62 and 63 are located on opposite sides of the street 64, the building 63 having relatively near its base a reflector 65 fabricated in accordance with my invention, which, as diagrammatically shown by the line L, serves to reflect light received from the sky to a source S which would otherwise not be received by the source S. As is shown light from the sky is refracted back to the reflecting surface of the reflector 65, thereby utilizing a great portion of such reflecting surface, reflected therefrom and then refracted to the light receiver. In Fig. 24 two light rays, designated by solid lines and referred to as A and B, respectively, similar to that illustrated by the line L in Fig. 23, are more clearly shown. The path of these light rays in the absence of a refractory medium 66 is shown by the dotted lines A' and B' respectively. With this arrangement, the reflecting surface 67 may be utilized but accordingly the reflector 65 will be less efficient. It is to be noted that lines indicating reflected light are more favorable for reception in the case of A and B than in the case of A' and B'. To reflect a light along similar lines from a reflector sans refractor medium 66, it would be necessary to arrange reflector 67 at a much greater angle 67' to the vertical which may be undesirable for obvious reasons, for example, it may collect dust, dirt, takes up much room, etc., and to an observer the reflecting surface will appear less uniform. It is to be understood that the reflector surface, shown in Fig. 23, is merely diagrammatic in form and that many facets or reflecting surfaces may be utilized, that the reflectors may be flexible and curved in any desired manner and generally bear a reflecting surface in accordance with the above described forms, for example those shown in Figs. 3 to 22 inclusive.

Not only may the reflectors illustrated and described be utilized outdoors but they find usefulness in connection with artificial sources of light indoors such as illustrated, by way of example, in Figs. 25, 26 and 27.

In Fig. 25 an electric lamp 68 arranged on the ceiling 69 of a room 70 serves with the aid of reflector 71, which may be of any ordinary type, to reflect light to sheet material 72 having a reflecting surface, in accordance with my invention; such sheet material may be flexible and applied in a manner similar to the application of wall paper to a wall surface. Light is reflected from said sheet material as shown by the lines 73 to the side walls and the occupants of the room in a predetermined and efficient manner to light it in accordance with some definite scheme. Likewise the walls of the room 70 may bear a similar reflecting surface 74.

It is also contemplated to stamp out or otherwise form reflectors in accordance with my invention in symmetrical, geometrical, or asymmetrical patterns as shown in elevation in Fig. 26 and in plan in Fig. 27. In these views the reflecting surfaces are arranged in concentric circular fashion to reflect the light from the electric lamp 75 directly to facets 76 and therefrom along lines 77, or from light source 75 to reflector 78 and therefrom to facets 76 from which the light is again reflected in accordance with some definite plan or scheme effecting a particular plan of illumination or display.

The invention is capable of an extremely wide use by reason of its simplicity both in manufacture and as regards its utilization. It is easily manufactured from inexpensive materials and in any size, and, in fact, sizes so small that the particular design of each reflecting unit or facet is unnoticeable. When the material is so made, it is obviously capable of uses that larger reflectors are incapable of. For example, where portions of the reflecting material are blocked or cut out to form a certain pattern or letter, the effect of a definite outline is not obtained unless the relative sizes of the reflecting units to the design of the outline is such as to make the design of each reflecting unit insignificant. Reflection from reflectors, in accordance with my invention, in contrast to that from known forms, is even, pleasing and generally more satisfactory.

It is contemplated that the finished reflecting material be of such nature that it may be easily cut to predetermined shape with simple tools, for example as by a pair of shears or knife. It is also capable of being produced in predetermined shapes in mass quantities by stamping means or other methods. The reflecting material may have one or both of its surfaces covered with an adhesive whereby it may be easily secured to other surfaces directly from the roll of reflecting material or it may be applied to a surface in a manner similar to the attachment of wall paper to a wall by an interior decorator; that is, by the application of a paste or other similar material to the wall surface and the subsequent application of the sheet reflecting material thereto. It is further contemplated that the reflecting surface of the sheet material be preferably of a plastic material such as may not be easily injured or if it be injured the remainder or uninjured portion of the reflector may not be rendered ineffective.

The plastic substance on the surface of the reflecting material may not only function as a protecting medium therefor but it may serve as a refractory medium definitely directing the rays of light in accordance with the laws of optics in a manner predetermined by the design and nature of the material itself. Not only may the material be fastened or secured to a surface by the use of a frame or by utilizing an adhesive, but it is of such a nature that it may easily be nailed or screwed to any surface.

It will be seen from the above that applicant has ingeniously devised a reflecting material capable of many uses in different manners and of such a simple nature whereby it may be fabricated of the simplest and least inexpensive materials and installed or secured with the simplest of tools.

It is to be understood that where I have used the expression "relatively shallow substantially contiguous facets," or an equivalent expression in the claims, that the word "shallow" is not to be construed as being shallow with respect to the thickness of the sheet reflector but simply meaning not so deep as to make the reflecting material so thick as to prevent its flexing. This will perhaps be better understood if reference is made to the drawings wherein the facets are disclosed as being almost as deep as the thickness of the sheet material.

It will be obvious to those skilled in the art that various changes may be made in my device without departing from the spirit of the invention and therefore I do not limit myself to what is shown in the drawings and described in the specification but only as indicated in the appended claims.

I claim:

1. A sheet having one of its surfaces formed with a plurality of indentations so formed in accordance with the laws of optics as to reflect light in the general direction of its source though a line from the source to the sheet be not perpendicular, said indentations being filled with a material substantially transparent, the reflecting units formed by the said indentations being of such design as to reflect substantially all the light transmitted to them from the light source, the depth of the units being within the range of approximately one-tenth of an inch or less.

2. A sheet having one of its surfaces formed with a plurality of indentations so formed in accordance with the laws of optics as to reflect light in the general direction of its source though a line from the source to the sheet be not perpendicular thereto, said sheet being covered on the side containing such indentations with a filler of substantially transparent material to a thickness slightly greater than the depth of the indentations whereby the front will be smooth and the corners of the indentations will be protected, the reflecting units formed by the said indentations being of such design as to reflect substantially all the light transmitted to them from the light source, the depth of the units being within the range of approximately one-tenth of an inch or less.

3. A flexible sheet having one of its surfaces formed with a plurality of indentations so formed in accordance with the laws of optics as to reflect light in the general direction of its source though a line from the source to the sheet be not perpendicular, said sheet being covered on the side containing such indentations with a filler of substantially transparent material to a thickness slightly greater than the depth of the indentations whereby the front will be smooth and the corners of the indentations will be protected, the reflecting units formed by the said indentations being of such design as to reflect substantially all the light transmitted to them from the light source, the depth of the units being within the range of approximately one-tenth of an inch or less.

4. A foil having indentations therein so formed in accordance with the laws of optics as to reflect light in the general direction of its source, though a line from the source to the foil be not perpendicular thereto, such indentations being filled with a substantially transparent substance, the reflecting units formed by the said indentations being of such design as to reflect substantially all the light transmitted to them from the light source, the depth of the units being within the range of approximately one-tenth of an inch or less.

5. A flexible light reflecting sheet having indentations formed therein in accordance with the laws of optics to reflect light in the general direction of its source though a line from the source to the sheet be not perpendicular thereto, said indentations being filled with a transparent substance, the reflecting units formed by the said indentations being of such design as to reflect substantially all the light transmitted to them from the light source, the depth of the units being within the range of approximately one-tenth of an inch or less.

6. A flexible metal foil having indentations so formed in accordance with the laws of optics to reflect light from a source in a predetermined general direction, the reflecting units formed by the said indentations being of such design as to reflect substantially all the light transmitted to them from the light source, the depth of the units being within the range of approximately one-tenth of an inch or less.

7. A foil having indentations therein shaped in accordance with the laws of optics to reflect light from a light source in a general predetermined direction, said indentations being filled with a transparent substance, the reflecting units formed by the said indentations being of such design as to reflect substantially all the light transmitted to them from the light source, the depth of the units being within the range of approximately one-tenth of an inch or less.

8. A foil having indentations therein shaped in accordance with the laws of optics to reflect light from a light source in a general predetermined direction, said indentations being filled with a transparent substance to a depth in excess of the depth of the indentations, the reflecting units formed by the said indentations being of such design as to reflect substantially all the light transmitted to them from the light source, the depth of the units being within the range of approximately one-tenth of an inch or less.

9. A flexible sheet reflector having its front surface so formed with relatively minute indentations as to reflect light from a light source in accordance with the laws of optics generally in a predetermined direction, the reflecting units formed by the said indentations being of such design as to reflect substantially all the light transmitted to them from the light source, the depth of the units being within the range of approximaely one-tenth of an inch or less.

10. A flexible sheet having one of its surfaces so formed with a plurality of indentations designed in accordance with the laws of optics to reflect light from a light source in a predetermined general direction, said indentations being of such relatively small size as compared with the outlines of said sheet that the general outlines of the sheet will not appear substantially disfigured to an observer at relatively close range, the reflecting units formed by the said indentations being of such design as to reflect substantially all the light transmitted to them from the light source, the depth of the units being within the range of approximately one-tenth of an inch or less.

11. Flexible sheet reflecting material comprising a substantially transparent sheet base having its back side so treated as to reflect light from a light source, and one of its sides so formed with a plurality of optical units of such relatively small size as compared with the outlines of said sheet that the general outlines of the sheet will not appear substantially disfigured to an observer at relatively close range, the reflecting units formed by the said indentations being of such design as to reflect substantially all the light transmitted to them from the light source, the depth of the units being within the range of approximately one-tenth of an inch or less.

12. Flexible sheet reflecting material comprising a substantially transparent sheet base and one of its sides so formed in accordance with the laws of optics whereby light will be reflected in a predetermined general direction.

13. A relatively large flexible sheet reflector having indentations formed on one of its surfaces in accordance with the laws of optics to reflect light, some of said indentations being formed to reflect light in one general direction and other of said indentations designed to reflect light in another general direction, said indentations being of such relatively small size as compared with the outlines of said sheet that the general outlines of the sheet will not appear substantially disfigured to an observer at relatively close range, the reflecting units formed by the said indentations being of such design as to reflect substantially all the light transmitted to them from the light source, the depth of the units being within the range of approximately one-tenth of an inch or less.

14. A flexible metal foil having indentations so formed in accordance with the laws of optics to reflect light from a source in a predetermined general direction, said indentations being filled on one side with a substantially transparent material, said indentations being filled on the other side to provide a smooth back surface, the reflecting units formed by the said indentations being of such design as to reflect substantially all the light transmitted to them from the light source, the depth of the units being within the range of approximately one-tenth of an inch or less.

15. A flexible metal foil so shaped in accordance with the laws of optics to reflect light from a source in a predetermined general direction, said foil being filled on both sides, on one side with a suitable transparent material and the other side with a material containing adhesive properties.

16. A sheet reflector having one of its surfaces so formed with a plurality of depressions as to reflect light in accordance with the laws of optics generally in a predetermined direction, said depressions being of such relatively small size as to permit the fabrication of said sheet in a thickness of small enough dimension to provide for its flexibility, a filling on one surface of said sheet of a substantially transparent cellulose derivative.

17. A flexible sheet reflector of substantially specular reflecting material having one of its surfaces so formed with a plurality of depressions as to reflect light from a light source in accordance with the laws of optics generally in a predetermined direction, said depressions being of such relatively small size as to permit the fabrication of said sheet in a thickness of small enough dimension to provide for its ready flexibility, a filling on one surface of said sheet of a substantially transparent cellulose derivative of a character and thickness as to be readily flexible and when combined with a reflector makes up a flexible laminated sheet, the entire thickness of the said flexible sheet being of such relatively small dimension as to lend itself readily for cutting with shears and for nailing as to a base, the reflecting units formed by the said indentations being of such design as to reflect substantially all the light transmitted to them from the light source, the depth of the units being within the range of approximately one-tenth of an inch or less.

18. A sheet reflector as in claim 17, said depressions being further of such relatively small size as compared with the outline of said sheet, that the general outlines of the sheet will not appear substantially disfigured to an observer at relatively close range.

19. Reflecting material comprising a sheet formed on one of its major surfaces with a plurality of facets, each facet being of such optical characteristics as to reflect light along lines in a definite fixed predetermined relation to the angle of light reception, each facet having a plane surface at an angle to the general plane of the sheet, a portion of the reflecting area of said facet being available for reflection of light from one given source and a portion of the area of said facet being unavailable, the ratio of the unavailable area to the available area being relatively small, whereby the sheet reflector will be characterized by high reflecting efficiency and whereby the sheet reflector may be relatively thin and the characteristic of flexibility inherent.

20. A reflector as in claim 19, one dimension of each of said facets being within the range of approximately one tenth of an inch or less, whereby the edge of said sheet will not appear substantially disfigured to an observer at close range.

21. A sheet reflector as recited in claim 19 made of a substantially transparent synthetic flexible plastic.

22. A sheet reflector as recited in claim 19 fabricated of metal.

23. Sheet reflecting material particularly adaptable for general use in connection with safety signs and markers, said material comprising a flexible laminated sheet structure of a thickness approximating one-tenth of an inch or less, said sheet structure by reason of its thickness and character may be readily flexed, said laminated structure including a relatively thin flexible substantially specular reflecting metal lamina formed with a plurality of relatively shallow substantially contiguous depressed facets of a design to produce an autocollimating effect, the depth of the depressions being approximately one-tenth of an inch or less, whereby by reason of the size of the depressions if the edge of the sheet be cut into a particular design, the cut edge will not appear substantially disfigured to an observer at close range, and an additional lamina comprising a substantially transparent flexible filler of cellulose acetate of a thickness of one-tenth of an inch or less on that side of the metal lamina formed with the said depressions, said filler extending from the bottom of the depressions to a plane outside the edges of said facets to provide a substantially smooth unbroken light entering surface for the reflector.

24. Sheet reflecting material particularly adaptable for general use in connection with safety signs and markers, said material comprising a flexible laminated sheet structure of a thickness approximating one-tenth of an inch or less, said sheet structure by reason of its thickness and character may be readily flexed, said laminated structure comprising a plurality of laminae, a first lamina being a transparent, protective, light entering and refracting medium, a second lamina being a smooth opaque substantially specular reflecting material, said first and second laminae being in good physical contact, said two laminae being formed to cooperatively provide a plurality of shallow, substantially contiguous facets on the rear face of said first lamina and the front face of said second lamina of a design to reflect light along lines in a definite fixed predetermined relation to the angle of light reception lines, said design causing reflection other than general diffusion, the thickness of the facets being approximately one-tenth of an inch or less, whereby by reason of the size of the depressions if the edge of the sheet be cut into a particular design, the cut edge will not appear substantially disfigured to an observer at close range, said first lamina having a generally planular exterior to provide a substantially smooth, unbroken light entering surface for the reflector.

25. The structure recited in claim 24, the second lamina compising a metal foil.

26. The structure recited in claim 24, the second lamina compising a precipitated metallic salt.

27. Sheet reflecting material particularly adaptable for general use in connection with safety signs and markers, said material comprising a flexible laminated sheet structure of a thickness approximating one-tenth of an inch or less, said sheet structure by reason of its thickness and character may be readily flexed, said laminated structure comprising a plurality of laminae, a first lamina being a transparent, protective, light entering and refracting medium, a second lamina being a smooth opaque substantially specular reflecting material, said first and second laminae being in good physical contact, said two laminae being formed to cooperatively provide a plurality of shallow substantially contiguous facets on the rear face of said first lamina and the front face of said second lamina of a design to reflect light along lines in a definite fixed predetermined relation to the angle of light reception lines, said design causing reflection other than general diffusion, the thickness of the facets being approximately one-tenth of an inch or less, whereby by reason of the size of the facets if the edge of one sheet be cut into a particular design, the cut edge will not appear substantially disfigured to an observer at close range, said first lamina having a geometric exterior surface non-parallel to its rear face to provide a substantially geometric light entering surface at variance with its rear surface.

28. The structure recited in claim 27, the reflecting material being covered on its rear side with a tacky adhesive.

THOGER G. JUNGERSEN.